2,843,522

PERI-ANAL OINTMENT

Thomas J. Mahon, Englewood, N. J., assignor, by mesne assignments, to Sterling Drug Inc., New York, N. Y., a corporation of Delaware No Drawing. Application November 17, 1953
Serial No. 392,751

4 Claims. (Cl. 167—63)

This invention relates to an ointment and more particularly to a peri-anal ointment.

It has been found that in newborn infants the skin around the anus, the external orifice of the rectum, becomes scaled by almost continuous contact of the skin with frequent loose stools. In older infants, there is an increasing incidence brought about by diarrheal stools induced from side reactions to antibiotic treatment as for colds, and other infectious ailments. Because the rash occurs around the anus it is called peri-anal dermatitis.

Patients who have had a colostomy, ileostomy, or the like suffer frequent irritations around the fistula. Because in such patients the fistula serves as the anus, the name peri-anal ointment is also applied to ointments used for the treatment of such fistulas.

Attempts have been made to prevent the formation of peri-anal dermatitis, and to cure peri-anal dermatitis by employing a barrier ointment to protect the skin surrounding the anus. Water repellent ointments such as those made of talc and zinc, or petroleum jelly, or cod liver oil have been employed to produce a mechanical barrier coating.

These type ointments although useful have the disadvantage of permitting surface bacteria to grow under the paste in the absence of an antiseptic. As an example, cod liver oil when used alone is an ideal medium for bacterial growth.

I have discovered an ointment which substantially prevents the formation of peri-anal dermatitis. My invention, a peri-anal ointment, comprises a water repellent ointment containing a protein material, preferably a caseinate of the class consisting of calcium, sodium, and ammonium and an antiseptic, a quaternary ammonium compound, preferably para di-isobutyl cresoxy ethoxy ethyl di-methyl benzyl ammonium chloride. I have further found that preferred results are obtained when the ointment also contains cod liver oil, which is allowable in the presence of the quaternary ammonium compound.

It is believed that skin excoriations in peri-anal dermatitis are, in fact, partial digestions of proteins on the infant's skin brought about by enzymes present in liquid stools of newborns, and in diarrheal stools of older infants. It is believed further that excellent results are obtained with the newly discovered peri-anal ointment because it forms with the protein material which it contains a competitive substrate upon which the enzymes in the stool act instead of upon the skin.

It is a feature of my invention that the antiseptic contained in the peri-anal ointment is effective in inhibiting the development of proteolytic and other enzymes by surface action on bacteria. Para di-isobutyl cresoxy ethoxy ethyl di-methyl benzyl ammonium chloride is especially advantageous in this respect. As is pointed out in U. S. Patent No. 2,643,969 for a "Diaper" which issued to me on June 30, 1953, para di-isobutyl cresoxy ethoxy ethyl di-methyl benzyl ammonium chloride prevents the growth of bacterium ammoniagenes.

This is important because the growth of this bacteria, a saprophytic gram positive bacillus, in contact with urea is accompanied by abundant production of ammonia, which causes skin irritation and other symptoms of ammonia dermatitis. It is a further feature of my invention that the anti-enzyme action, the surface active action, and the protein material act in combinations to protect the skin when applied prior to damage to the skin and to accelerate granulation and thus repair of the skin when applied after damage has occurred.

The protein material employed in my peri-anal ointment is preferably selected from a caseinate of the class consisting of calcium, sodium, and ammonium. Other protein materials such as gelatin or albumins can also be employed but the caseinates are more stable and give preferred results. The percent by weight of protein material in the peri-anal ointment is small, and may be varied. Preferred results are obtained when the peri-anal ointment contains 2 to 10 percent by weight protein material, and especially preferred results are obtained when the per-anal ointment contains 5 percent by weight protein material.

In accordance with my invention the percent by weight of the quaternary ammonium compound in the peri-anal ointment is very small. Preferred results are obtained when the peri-anal compound contains from 0.05 to 0.2 percent by weight of a quaternary ammonium compound. Especially preferred results are obtained when the peri-anal ointment contains 0.1 percent of a quaternary ammonium compound.

As has been pointed out, preferred results are obtained when the peri-anal ointment contains cod liver oil. The vitamins A and D contained in the cod liver oil assist in promoting epithelization. The percent by weight of the cod liver oil in the peri-anal ointment may be varied but preferred results are obtained when the ointment contains from 1 to 10 percent cod liver oil, and especially preferred results are obtained when it contains 5 percent cod liver oil.

The following is an example of a preferred embodiment of my invention.

Example 1

| | Parts by weight |
|---|---|
| Cod Liver Oil, U. S. P. Grade | 5 |
| Oxycholesterin Absorption Base (sold under trademark name of Falba) | 5 |
| Lanolin Liquid Esters (sold under trademark name of Lanogene) | 5 |
| Petrolatum | 49.85 |
| Zinc Oxide | 20 |
| Corn Starch | 10 |
| Calcium Caseinate | 5 |
| Para Di-Isobutyl Cresoxy Ethoxy Ethyl Di-Methyl Benzyl Ammonium Chloride | 0.1 |
| Perfume | 0.05 |

The oxycholesterin absorption base (sold under the trademark name of Falba) consists of oxycholesterins, cholesterins and other cholesterin esters, derived from wool grease and refined lanolin. In preparing the ointment, cod liver oil, oxycholesterin absorption base and lanolin liquid esters are melted, and para di-isobutyl cresoxy ethyl di-methyl benzyl ammonium chloride is dissolved therein. Petrolatum is added, the resulting mixture is heated to dissolve the petrolatum, the powders are added and well mixed. When the temperature has dropped to about 45° to 50° C. perfume is added. The product is then thoroughly mixed and then is milled through an Eppenbach mill to produce a smooth preparation. As has been pointed out, other quaternary ammonium compound can be employed but preferred results are obtained with para di-isobutyl cresoxy ethyl di-methyl benzyl ammonium chloride.

The ointment can be produced on a laboratory, semi-works, or commercial scale employing modifications well known to those skilled in the art.

Obviously many modifications and variations of the invention, as hereinbefore set forth, may be made without departing from the spirit and scope thereof, but only such limitations should be imposed as are indicated in the appended claims.

I claim:

1. A water repellent peri-anal ointment comprising about 50 percent by weight petrolatum, from about 0.05 to 0.2 percent by weight para di-isobutyl cresoxy ethyl di-methyl benzyl ammonium chloride, and from about 2 to 10 percent by weight calcium caseinate.

2. A water repellent peri-anal ointment comprising about 50 percent by weight petrolatum, about 0.1 percent by weight para di-isobutyl cresoxy ethoxy ethyl di-methyl benzyl ammonium chloride and about 5 percent by weight calcium caseinate.

3. A peri-anal ointment containing about 5 percent by weight cod liver oil, about 50 percent petrolatum, about 20 percent zinc oxide, about 10 percent corn starch, about 0.1 percent para di-isobutyl cresoxy ethyl di-methyl benzyl ammonium chloride, and about 5 percent calcium caseinate.

4. A peri-anal ointment containing about 5 percent by weight cod liver oil, about 5 percent oxycholesterin absorption base, about 5 percent lanolin liquid esters, about 50 percent petrolatum, about 20 percent zinc oxide, about 10 percent corn starch, about 0.1 percent para di-isobutyl cresoxy ethyl di-methyl benzyl ammonium chloride, and about 5 percent calcium caseinate.

References Cited in the file of this patent

UNITED STATES PATENTS

| 1,663,323 | Whatmough | Mar. 20, 1928 |
| 2,666,013 | Ferguson | Jan. 12, 1954 |
| 2,666,728 | Smith | Jan. 19, 1954 |

FOREIGN PATENTS

| 730,693 | Germany | Jan. 15, 1943 |

OTHER REFERENCES

Meyer: Pharmazeutische Monotshefte, vol. 16, 1934, p. 120.

Niedelman: J. Pediatrics, November 1950, vol. 37, No. 5, pp. 762–764.

Hesemann: Fette und Seifen, vol. 49, January 1942, pp. 42–44.